Patented June 15, 1943

2,321,595

UNITED STATES PATENT OFFICE 2,321,595

AMINO CARBOXYLIC ACID ESTERS

Benjamin R. Harris, Chicago, Ill.

No Drawing. Application February 5, 1941,
Serial No. 377,490

12 Claims. (Cl. 260—404)

This invention relates to the preparation of new chemical compounds which are especially useful for antiseptic, medicinal, preservative, bactericidal, bacteriostatic, germicidal and fungicidal purposes.

The novel substances of the present invention, generally used in the form of their salts, may be regarded as primary amino-carboxylic acid esters, of aliphatic polyhydroxy substances partially esterified with carboxylic acids, particularly higher molecular weight fatty acids, especially satisfactory being those derived from fatty acids containing from eight to fourteen carbon atoms, the aliphatic polyhydroxy substances containing at least four esterifiable hydroxy groups.

In order that the nature of the invention may become more apparent, there are listed hereinbelow various of the novel substances which generally are used in the form of salts, especially, hydrochlorides, and fall within the scope of the invention:

(1)
$$\begin{array}{l}CH_2-O-\overset{O}{\underset{\|}{C}}-C_{11}H_{23}\\(CHOH)_4\\CH_2-O-\underset{\|}{C}-CH_2-NH_2\\\phantom{CH_2-O-}O\end{array}$$

(2) 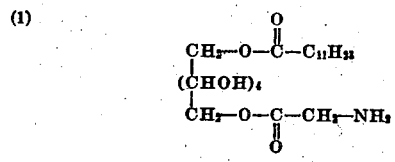

(3) 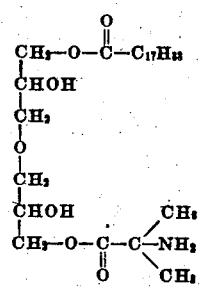

(4)
$$\begin{array}{l}CH_2-O-\overset{O}{\underset{\|}{C}}-C_{17}H_{33}\\\phantom{CH_2-O-}CH_2OH\\C\\\phantom{CH_2-O-}CH_2OH\\CH_2-O-\underset{\|}{C}-CH-CH_2-CH_2-CH_3\\\phantom{CH_2-O-}O\phantom{-}NH_2\end{array}$$

(5)
$$\begin{array}{l}CH_2-O-\overset{O}{\underset{\|}{C}}-C_{11}H_{23}\\\phantom{CH_2-O-}CH_2-O-\underset{\|}{C}-CH_2-NH_2\\C\phantom{CH_2-O-CH_2-O-}O\\\phantom{CH_2-O-}CH_2-O-\underset{\|}{C}-CH_2-NH_2\\\phantom{CH_2-O-CH_2-O-}O\\CH_2-O-\underset{\|}{C}-CH_2-NH_2\\\phantom{CH_2-O-}O\end{array}$$

(6) 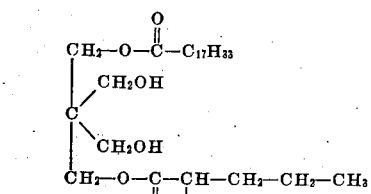

(7) 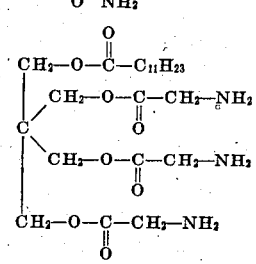

(8) 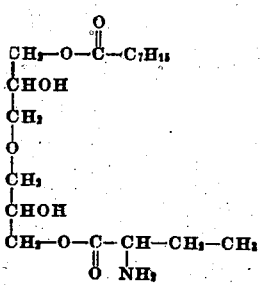

The substances are prepared, preferably, by converting the amino-carboxylic acid into its acyl chloride or a salt of its acyl chloride, such as the hydrochloride, and reacting the same with the stoichiometric equivalent of the partial ester of the aliphatic polyhydroxy substance.

The following examples are illustrative of a method which has been found suitable for preparing the various compounds which are disclosed herein. It will be appreciated that other methods may be utilized, that the proportions of reacting ingredients, times of reaction, order of steps, and temperatures may be varied and that supplementary processes of purification and the like may be resorted to wherever found desirable or convenient. These and other variations and modifications will be evident to those skilled in the art in the light of the guiding principles which are disclosed herein.

*Example A*

3.6 grams of the oleic acid mono-ester of mannitan were heated, at 55 degrees C. to 108 degrees C., with 5.3 grams of the hydrochloride of alpha-amino isobutyryl chloride in 10 cc. of toluene, the heating being continued for a period of about 2 hours or until evolution of hydrochloric acid substantially ceased. At the end of the heating period, most of the toluene was removed, and the residue was extracted with 50 cc. of hot acetone. The resulting acetone solution was evaporated to dryness. The product obtained was powdered in which form it was a light tan in color and dissolved in water to form a clear solution. Analysis indicated that the product comprised a mixture of the hydrochlorides of the alpha-amino isobutyric acid mono- and di-esters of the oleic acid mono-ester of mannitan.

The acetone-insoluble fraction was also soluble in water to provide a clear solution. Analysis indicated that it contained a substantial proportion of the oleic acid ester of mannitan at least two of the hydroxy groups thereof being esterified with alpha-amino isobutyric acid. The product also appeared to contain alpha-amino-isobutyric acid hydrochloride as well as some hydrochloride of alpha-amino isobutyryl chloride.

*Example B*

35 grams of the lauric acid mono-ester of a polyglycerol (consisting largely of di-glycerol) and 14 grams of the hydrochloride of alpha-amino acetyl chloride are reacted under conditions similar to those described hereinabove in connection with Example A. The reacted product contains a substantial proportion of alpha-amino acetic acid mono- and di-esters of lauric acid mono-ester of diglycerol.

*Example C*

14 grams of the oleic acid mono-ester of a polyglycerol having an average molecular weight of about 160 (consisting essentially of diglycerol) were washed and dried so that it contained substantially no free oleic acid. 14 grams of this material were heated with 16 grams of the hydrochloride of alpha-amino isobutyryl chloride and 100 cc. of benzene for somewhat in excess of an hour at a temperature of 80 degrees C. When the vigorous evolution of hydrochloric acid had ceased and the benzene had been driven off, 50 cc. of toluene were added and the mixture was heated at 95 degrees C.–108 degrees C. for approximately an hour. The resulting reaction mixture was then extracted with 500 cc. of hot acetone. The solvent was removed from the decanted acetone solution and the residue dried at 120 degrees C. The product was a brown, resinous material which was then ground to a light tan powder. The product, which was soluble in water, showed, on analysis, approximately 93%–94% of the hydrochloride of alpha-amino isobutyric acid esters of the mono-oleic acid esters of the polyglycerol. The average molecular weight of said compound was approximately 600, which corresponded to the alpha-amino isobutyric acid mono-ester of the oleic acid ester of the polyglycerol. The product appeared to contain a small amount of unreacted oleic acid ester of the polyglycerol together with some free hydrochloride of alpha-amino isobutyric acid.

The acetone-insoluble material was also dried and powdered. It was a white solid and readily dissolved in water to form a clear solution. An analysis indicated the presence of about 85% of a compound having an average molecular weight of about 300. This corresponds to a product containing an average of two alpha-amino isobutyric acid ester groups per molecule. The balance, or about 15% of the product, comprised the free hydrochloride of the alpha-amino isobutyric acid.

It will be understood that the substances may, for certain purposes, be employed in the form of impure reaction mixtures containing substantial proportions of the effective compounds. Where the substances are used for bactericidal, germicidal and like purposes, however, purification procedures may be employed to produce pure or substantially pure products. Those versed in the art are familiar with the types of purification methods which may be employed with advantage herein, particularly in the light of the disclosures made hereinabove.

The aliphatic polyhydroxy substances having at least four esterifiable hydroxy groups whose derivatives, as set forth hereinabove, comprise the subject matter of the present invention, may be selected from a large group including, by way of illustration, pentaerythritol; quercitol; polyglycerols such as diglycerol, triglycerol, tetraglycerol and the like including mixtures thereof; carbohydrates and sugars including mono-, di- and polysaccharides such as dextrose, sucrose, xylose, arabinose, galactose, fructose, maltose, mannose, dextrin, starch, and the like; the natural and synthetic simple and complex glucosides; sugar alcohols such as arabitol, mannitan, sorbitan, mannitol, sorbitol and dulcitol; and hydroxyethyl and hydroxypropyl ether derivatives as, for example:

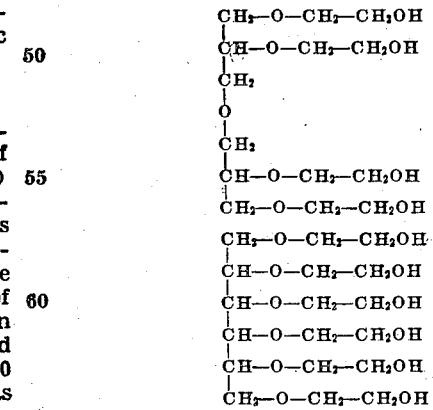

(For convenience, all hydroxyl groups are written facing one way.)

The carboxylic acid acyl radicals, which are esterified with the aforementioned or other aliphatic polyhydroxy substances having at least four esterifiable hydroxy groups, may be derived from various sources. Among such sources may be mentioned the straight chain and branched chain, saturated and unsaturated, carboxylic, aliphatic (including cycloaliphatic), fatty, aromatic, hydroaromatic, and araliphatic acids including acetic acid, propionic acid, butyric acid, caproic acid, pimelic acid, caprylic acid, capric acid, sebacic acid, behenic acid, arachidic acid, cerotic acid, erucic acid, melissic acid, stearic acid, oleic acid, ricinoleic acid, ricinelaidic acid, ricinostearolic acid, linoleic acid, linolenic acid, lauric acid, myristic acid, palmitic acid, mixtures of any two or more of the above mentioned acids or other acids, mixed higher fatty acids derived from animal or vegetable sources, for example, lard, coconut oil, rapeseed oil, sesame oil, palm kernel oil, palm oil, olive oil, corn oil, cottonseed oil, sardine oil, tallow, soya bean oil, peanut oil, castor oil, seal oils, whale oil, shark oil and other fish oils, partially or completely hydrogenated animal and vegetable oils such as those mentioned; oxidized hydroxy and alpha-hydroxy higher carboxylic, aliphatic and fatty and/or polymerized higher fatty acids or higher fatty acids derived from oxidized and/or polymerized triglyceride oils; acyloxy carboxylic acids such as $C_{17}H_{35}$—CO—O—$CH_2$—COOH; acids such as 1-hydroxy stearic acid, dihydroxypalmitic acid, di-hydroxy-stearic acid, dihydroxybehenic acid, alpha-hydroxy capric acid, alpha-hydroxy stearic acid, alpha-hydroxy palmitic acid, alpha-hydroxy lauric acid, alpha-hydroxy myristic acid, alpha-hydroxy coconut oil mixed fatty acids, alpha-hydroxy margaric acid, alpha-hydroxy arachidic acid, and the like; fatty and similar acids derived from various waxes such as beeswax, spermaceti, montan wax, coccerin, and carnauba wax and higher molecular weight carboxylic acids derived, by oxidation and other methods, from paraffin wax, petroleum and similar hydrocarbons; resinic and hydroaromatic acids such as hexahydrobenzoic acid, naphthenic acid and abietic acid; araliphatic and aromatic acids such as phthalic acid, benzois acid, Twitchell fatty acids, naphthoic acid, pyridine carboxylic acid; hydroxy aromatic acids such as salicylic acid, hydroxy benzoic and naphthoic acids, and the like. It will be understood that mixtures of any two or more of said acids may be employed if desired and it will also be appreciated that said acids may contain substituent groups such as sulphate, sulphonic, nitrile, cyanogen, carbonyl, amide, amine, halogen, ketone and other groups. The acids may be employed as such or in the form of their anhydrides, esters including mono-, di-, triglycerides and the like, and acyl halides, or, in general, in the form of any of their acylating compounds. Of particular utility, where the final compounds are used as antiseptics, bactericides, germicides and the like, are the unsubstituted fatty acids containing from eight to fourteen carbon atoms and their acyl halides, lauric acid or its acyl halide or coconut oil mixed fatty acids or their acyl halides being especially satisfactory.

The amino-carboxylic acids which are or may be utilized in the preparation of the substances include, among those previously mentioned and others, alpha-amino acetic acid, alpha-amino propionic acid, alpha-amino butyric acid, beta-amino butyric acid, alpha-amino-n-valeric acid, alpha-amino isobutyric acid, alpha-amino isovaleric acid, phenyl-alanine, tyrosine, tryptophane, cystine, arginine, amino poly-carboxylic acids such as amino succinic acid, amino glutaric acid, amino citric acid, amino malonic acid, amino adipic acid, amino sebacic acid, and the like; the amino-carboxylic acids or mixtures thereof obtained by the hydrolysis of proteins or protein-containing materials such as gluten, soya bean flour and the like, whether by enzymatic action, by acids or by any other means. Other amino-carboxylic acids include the synthetic polypeptides as well as those resulting from the hydrolysis of proteins or protein-containing materials. Illustrative examples of such polypeptides are glycyl-glycine and leucyl-glycyl-glycine. It will be understood that mixtures of any two or more of the foregoing or other amino-carboxylic acids may be utilized in the preparation of the substances of the present invention. It will also be understood that any of these amino-carboxylic acids may be esterified with any of the carboxylic acid esters disclosed hereinabove.

As indicated hereinabove, the compounds are best used in the form of salts, preferably in the form of substantially neutral salts or at a pH of about 6.7. The hydrochlorides are especially satisfactory but other salts may be employed, in certain instances, such as the sulphates, phosphates, nitrates, propionates, gluconates, sulphoacetates, sulphosuccinates, hydrobromides, hydriodides, lactates, tartrates, citrates, salts of amino-carboxylic acids, and the like. The free esters of the amino-carboxylic acids generally possess limited solubility in water and, for that reason, the esters are used in the form of their salts, the salts possessing substantially greater water solubility. It is, however, within the broader scope of the invention to employ the free esters, using solvent media other than water or water alone, or by solubilizing the esters in any desired manner.

It will be understood that the numerous compounds disclosed herein will vary somewhat in bactericidal, germicidal, bacteriostatic, antiseptic and fungicidal power or potency and that the effects will also vary depending upon the environment in which the compounds are used. The compounds are employed particularly in dilute aqueous or modified aqueous solutions, usually on the order of 0.1% to several thousandths of 1%. They may be used internally or externally and either as such or in conjunction with other agents having bactericidal, germicidal, antiseptic or like action. Particularly satisfactory use is in connection with dentifrices such as tooth powders, tooth pastes, liquid dentifrices, and mouth washes. In such cases, the proportions of the salts of the esters may, if desired, be somewhat higher than those set forth hereinabove. Their especial utility in dentifrices resides not only in the fact that they possess bactericidal, germicidal, and similar properties but, in addition, they are innocuous, non-toxic and relatively tasteless.

Among the bacteria, the metabolism of which is strongly inhibited by many of the compounds of the present invention, are the following: *Staphylococcus aureus*, *Staphylococcus albus*, *Sarcina lutea*, *Micrococcus tetragenus*, *Bacilli coli*, *Aerobacter aerogenes*, *Ps. pyocyaneus*, *Proteus vulgaris*. Many of the substances are also effective against pneumococcus. In addition, the phenol coefficients of many of the compounds are substantially higher than that of phenol.

The term "higher," as used herein and in the claims to describe carboxylic and fatty acids and the like, will be understood to mean at least eight carbon atoms unless otherwise specifically stated.

Wherever the term "amino-carboxylic acid esters" or like expression is employed in the claims, it will be understood to cover the compounds irrespective of whether they are neutralized to form salts or are present as the free base.

While the invention has been described in detail, it is to be understood that the scope thereof is not to be limited other than is set forth in the claims.

What I claim as new and desire to protect by Letters Patent of the United States is:

1. Primary amino-carboxylic acid esters of aliphatic polyhydroxy substances partially esterified with carboxylic acids, said aliphatic polyhydroxy substances containing at least four esterifiable hydroxy groups.

2. Aliphatic primary amino-carboxylic acid esters of aliphatic polyhydroxy substances partially esterified with higher molecular weight fatty acids, said aliphatic polyhydroxy substances containing at least four esterifiable hydroxy groups.

3. Aliphatic primary alpha-amino-carboxylic acid esters of aliphatic polyhydroxy substances partially esterified with lauric acid, said aliphatic polyhydroxy substances containing at least four esterifiable hydroxy groups.

4. Salts of aliphatic primary amino-carboxylic acid esters of aliphatic polyhydroxy substances partially esterified with higher molecular weight fatty acids, said aliphatic polyhydroxy substances containing at least four esterifiable hydroxy groups.

5. Hydrochlorides of aliphatic primary amino-carboxylic acid esters of aliphatic polyhydroxy substances partially esterified with higher molecular weight fatty acids, said aliphatic polyhydroxy substances containing at least four esterifiable hydroxy groups.

6. Hydrochlorides of glycine esters of aliphatic polyhydroxy substances partially esterified with fatty acids, said aliphatic polyhydroxy substances containing at least four esterifiable hydroxy groups.

7. Aliphatic primary amino-carboxylic acid esters of higher molecular weight fatty acid partial esters of polyglycerols.

8. Hydrochlorides of aliphatic primary amino-carboxylic acid esters of higher molecular weight fatty acid partial esters of polyglycerols.

9. Aliphatic amino-carboxylic acid esters of higher molecular weight fatty acid partial esters of sugar alcohols.

10. Hydrochlorides of aliphatic primary amino-carboxylic acid esters of higher molecular weight fatty acid partial esters of sugar alcohols.

11. Hydrochlorides of glycine esters of higher molecular weight fatty acid partial esters of sugar alcohols.

12. Hydrochlorides of alpha-amino isobutyric acid esters of higher molecular weight fatty acid partial esters of aliphatic polyhydroxy substances containing at least four esterifiable hydroxy groups.

BENJAMIN R. HARRIS.